(12) United States Patent
Alaranta et al.

(10) Patent No.: US 10,216,614 B2
(45) Date of Patent: Feb. 26, 2019

(54) SAMPLING APPROACHES FOR A DISTRIBUTED CODE TRACING SYSTEM

(71) Applicant: Amazon Technologies, Inc., Seattle, WA (US)

(72) Inventors: Anssi Alaranta, Seattle, WA (US); Rohit Banga, Seattle, WA (US); James Bowman, Seattle, WA (US); Sandra McMullen, Seattle, WA (US); Jeffrey Hoffman, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 74 days.

(21) Appl. No.: 15/378,177

(22) Filed: Dec. 14, 2016

(65) Prior Publication Data

US 2018/0150383 A1 May 31, 2018

Related U.S. Application Data

(60) Provisional application No. 62/426,588, filed on Nov. 27, 2016.

(51) Int. Cl.
| | |
|---|---|
| *G06F 11/36* | (2006.01) |
| *G06F 17/30* | (2006.01) |
| *G06F 11/34* | (2006.01) |
| *G06F 11/30* | (2006.01) |

(52) U.S. Cl.
CPC ...... *G06F 11/3636* (2013.01); *G06F 11/3017* (2013.01); *G06F 11/3433* (2013.01); *G06F 11/3438* (2013.01); *G06F 11/3476* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 9,438,491 B1 | 9/2016 | Kwok et al. | |
| 2002/0178403 A1 | 11/2002 | Floyd et al. | |
| 2005/0038833 A1 | 2/2005 | Colrain et al. | |
| 2006/0020918 A1* | 1/2006 | Mosberger | G06F 11/3409 717/124 |

(Continued)

FOREIGN PATENT DOCUMENTS

EP 2871574 A1 5/2015

OTHER PUBLICATIONS

U.S. Appl. No. 15/378,367, entitled "Distributed Code Tracing System," and filed Dec. 14, 2016.

(Continued)

*Primary Examiner* — Philip Wang
(74) *Attorney, Agent, or Firm* — Thomas | Horstemeyer, LLP

(57) ABSTRACT

Disclosed are various embodiments for sampling in a distributed code tracing system. A sampling service receives a segment of a code trace corresponding to a request submitted to a particular application of a plurality of applications hosted in a computing environment. The code trace documents at least one call to at least one component service of the particular application to respond to the request. The sampling service determines whether to forward the segment to a trace processing system or to discard the segment based at least in part on at least one sampling parameter.

20 Claims, 12 Drawing Sheets

(56) References Cited

U.S. PATENT DOCUMENTS

| | | | |
|---|---|---|---|
| 2006/0184832 A1 | 8/2006 | Floyd et al. | |
| 2007/0074081 A1* | 3/2007 | DeWitt, Jr. | G06F 11/3409 |
| | | | 714/45 |
| 2012/0060142 A1* | 3/2012 | Fliess | G06F 8/70 |
| | | | 717/102 |
| 2013/0283240 A1* | 10/2013 | Krajec | G06F 11/3636 |
| | | | 717/128 |
| 2013/0283241 A1* | 10/2013 | Krajec | G06F 11/3636 |
| | | | 717/128 |
| 2013/0283246 A1* | 10/2013 | Krajec | G06F 11/3466 |
| | | | 717/130 |
| 2013/0283281 A1* | 10/2013 | Krajec | G06F 11/3433 |
| | | | 718/102 |
| 2015/0058605 A1 | 2/2015 | Madampath | |
| 2018/0131590 A1* | 5/2018 | Penno | H04L 43/04 |

OTHER PUBLICATIONS

Search Report and Written Opinion for PCT/US20171062869 dated Feb. 20, 2018.
U.S. Appl. No. 15/378,367, filed Dec. 14, 2016, Non-Final Office Action dated Aug. 9, 2018.

* cited by examiner

SAMPLING APPROACHES FOR A DISTRIBUTED CODE TRACING SYSTEM

CROSS-REFERENCE TO RELATED APPLICATION

This application claims the benefit of U.S. Provisional Application 62/426,588, entitled "DISTRIBUTED CODE TRACING SYSTEM," and filed on Nov. 27, 2016, which is incorporated herein by reference in its entirety.

BACKGROUND

A service-oriented architecture is a software design paradigm in which application components provide services to other application components through a communication protocol. By using an abstraction similar to that of object oriented programming, services can be deployed on multiple computing devices and in multiple locations, which allows for scaling and flexibility. Microservices are a particular approach to service-oriented architecture with a small granularity. Under a microservices approach, a single request for a web page might be handled by dozens of different services that are each specialized to perform a specific task.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
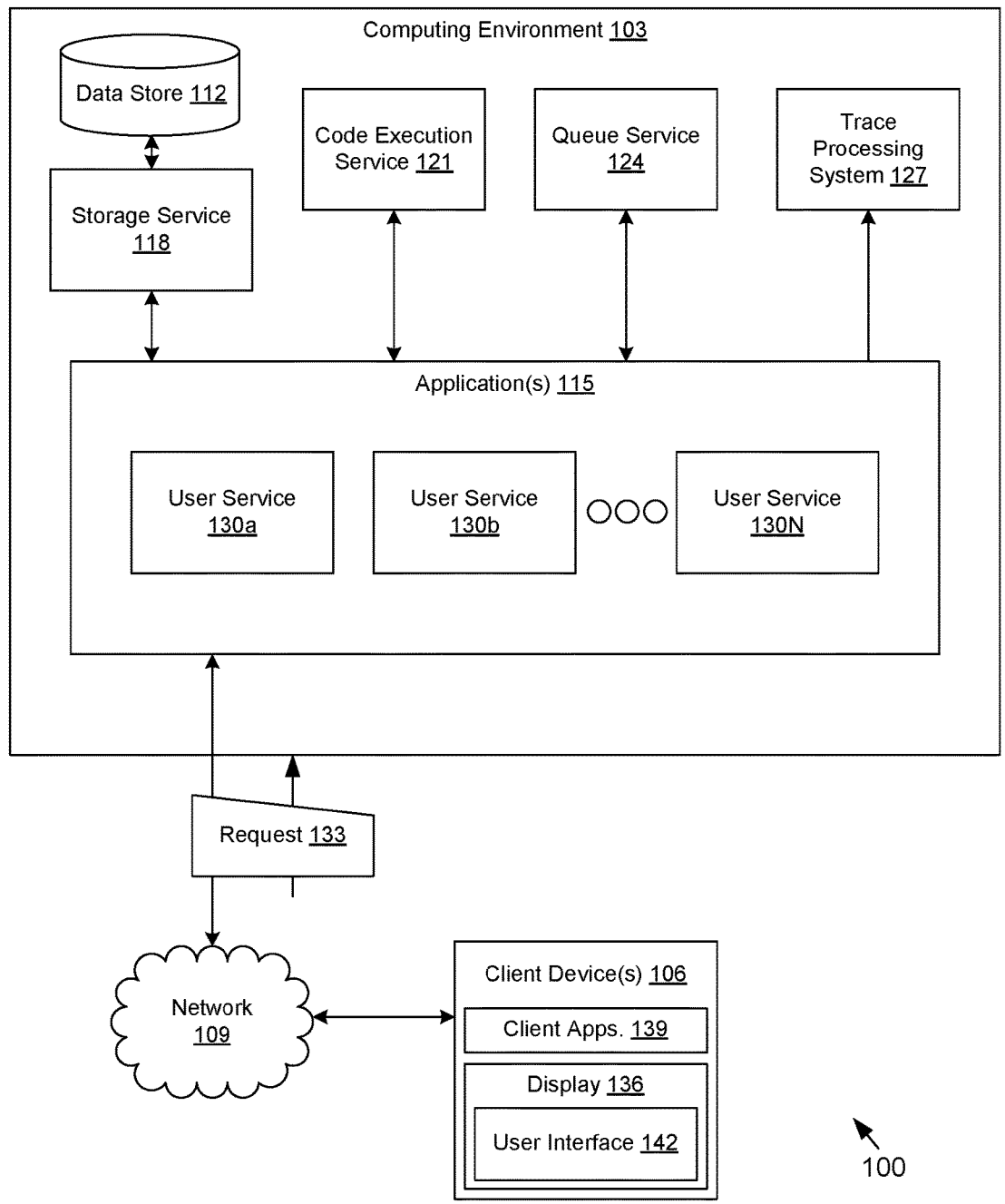
FIG. 1 is a schematic block diagram of a networked environment according to various embodiments of the present disclosure.

The present disclosure relates to providing code tracing as a service. Service-oriented architectures, and particularly those involving microservices, can be extremely difficult to debug. As a single request to generate a web page may result in dozens of different microservice calls, a failure or software defect in any one of the microservices may result in a failure or error in generating the web page. For example, a customer request to add an item to an electronic shopping cart may result in a call to a first service to identify the customer, a call to a second service to verify the price of the item, a call to a third service to verify a shipping address, a call to a fourth service to confirm warehouse availability of the item, and so forth. Any of these dependent services may exhibit defects or may not be operating properly.

In searching out software defects or performing an operational assessment, code traces are often helpful. For instance, code traces can assist in identifying performance bottlenecks, edge case errors, and other hard-to-detect issues. A code trace can identify which services are invoked by a particular service, along with associated metadata such as parameters, timestamps, results, and so on. With microservices, code traces can become extremely lengthy and complex, and tracing itself can introduce a significant resource overhead.

Various embodiments of the present disclosure introduce an architecture for providing code tracing as a service, specifically within hosted, multi-tenant computing environments. Web services and other service-based applications may be hosted by a third-party computing resource provider under a utility computing model. Such a hosted environment offers many advantages, including resource elasticity or scaling, distribution across a network for increased availability and fault tolerance, and abstraction of the underlying hardware and/or operating systems.

As will be described, a tracing architecture can be deployed by the computing resource provider to collect and store code traces for multiple resource customers. The code traces may be indexed and made searchable. Also, graphical user interfaces may be generated from analyses of the traces to visualize operational aspects of the resource customers' services. In this way, resource customers can simply include a tracing application programming interface (API) in their software code to enable tracing, without having to install tracing software or worry about backend concerns such as scalability.

In some embodiments, the tracing architecture may include sampling functionality to reduce the traces that are collected. While it may be feasible to collect all traces for a lower volume resource customer, it may not be cost effective to collect all traces for an extremely high volume resource customer. Thus, sampling may be employed to collect and store a representative quantity of traces, either periodically or in response to events. As will be described, the sampling architecture may employ a hybrid of Bernoulli sampling and reservoir sampling. Variable sampling rates can be established for different routes in a distributed system based, for example, on uniform resource locator (URL), domain name, and/or path. In the following discussion, a general description of the system and its components is provided, followed by a discussion of the operation of the same.

With reference to FIG. 1, shown is a networked environment 100 according to various embodiments. The networked environment 100 includes a computing environment 103 and one or more client devices 106, which are in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time. In particular, the computing environment 103 may be operated by a hosting provider under a multi-tenant utility computing model, such that computing capacity in the computing environment 103 is provided to multiple customers on a metered basis.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below. For example, the data store 112 may comprise a key-value data store (e.g., a NoSQL data store), a relational database management system (RDBMS), or another type of data store.

The components executed on the computing environment 103, for example, include applications 115, a storage service 118, a code execution service 121, a queue service 124, a trace processing system 127, and other services, processes, systems, engines, or functionality not discussed in detail herein. The applications 115 correspond to customer-owned applications that are hosted by the computing environment 103. The applications 115 may be web-based applications or web services that use hypertext transfer protocol (HTTP), simple object access protocol (SOAP), representational state transfer (REST), and/or related technologies. The applications 115 may be relatively simple or relatively complex, potentially being made up of a plurality of user services 130a, 130b . . . 130N that are referred to as component services of the respective application 115. A user service 130 may invoke other user services 130, other services in the computing environment 103, or external services outside of the computing environment 103. Also, the applications 115 may vary in their amount of incoming traffic: some applications 115 may be extremely popular, while others are seldom invoked.

An application 115 may be configured to process one or more types of requests 133 submitted by client devices 106 via the network 109. The different types of requests 133 may be distinguished by their uniform resource locator (URL), domain name, path name, or other identifier. For example, the application 115 may generate one or more web pages, data for mobile applications, and/or other forms of network content as a result. The result is returned by the application 115 to the client device 106 via the network 109 for rendering by the client device 106. In some cases, an application 115 may be invoked programmatically by another application 115 executing on another server.

The storage service 118 facilitates access to data stored by the data store 112. For example, the storage service 118 may facilitate storing data, deleting data, overwriting data, or other functions. The storage service 118 may track utilization metrics for billing purposes, where the utilization may be tracked in terms of quantity of data stored, quantity of data transferred, and/or quantity of requests. The storage service 118 may provide varying levels of service at varying levels of cost. For example, the storage service 118 may provide eventually consistent data storage at a lower cost than consistent data storage. Also, the storage service 118 may provide cold storage services where retrieval operations are more costly than storage operations.

A code execution service 121 receives code uploaded by customers and executes the code to perform a function, such as providing computations for a user service 130. A queue service 124 enables temporary storage to pass messages among user services 130 and applications 115. Usage of the code execution service 121 and the queue service 124 may be metered and billed to the customer.

The trace processing system 127, as will be described in detail, provides optional code trace capturing and analysis for applications 115 and user services 130 hosted in the computing environment 103. In addition, the trace processing system 127 may monitor operations performed by offered services, such as the storage service 118, code execution service 121, and queue service 124, among others.

Use of the trace processing system 127 may also be monitored and billed based on resource consumption as indicated by quantities of traces that are sampled and/or quantities of traces processed during analysis. It is noted that the trace processing system 127, like the storage service, the code execution service 121, and the queue service 124, can be made available to multiple customers of the hosting provider. To provide tracing data, the code of the applications 115 and user services 130 may simply call a tracing application programming interface (API) that is linked to the trace processing system 127.

The client device 106 is representative of a plurality of client devices that may be coupled to the network 109. The client device 106 may comprise, for example, a processor-based system, such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display 136. The display 136 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 139 and/or other applications. The client application 139 may be executed in a client device 106, for example, to access network content served up by the computing environment 103 and/or other servers, thereby rendering a user interface 142 on the display 136. To this end, the client application 139 may comprise, for example, a browser, a dedicated application, etc., and the user interface 142 may comprise a web page, an application screen, etc.

Figure 2:
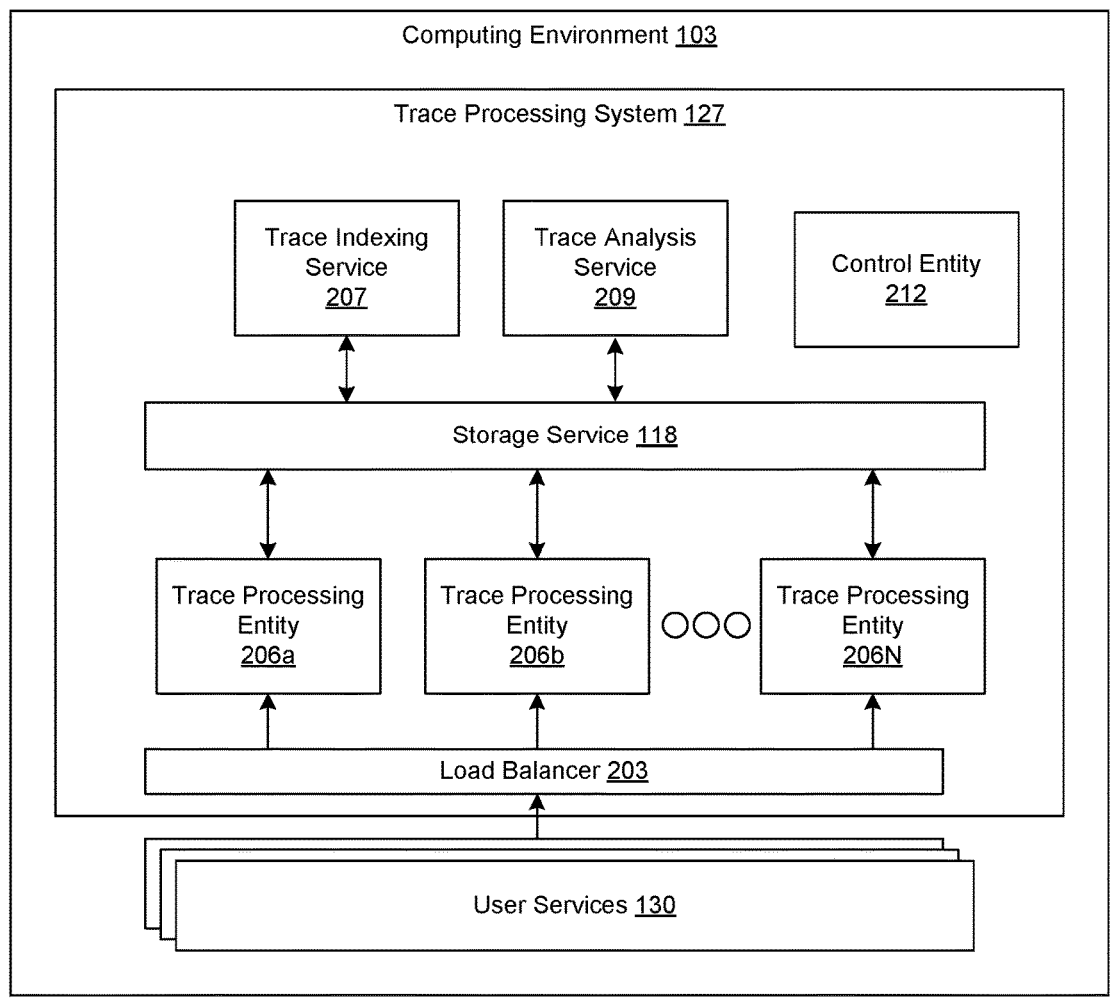
FIGS. 2 and 3 are schematic block diagrams of a computing environment used in the networked environment of FIG. 1 according to various embodiments of the present disclosure.

Turning now to FIG. 2, shown is an alternative view of the computing environment 103 (FIG. 1) according to various embodiments. In particular, the computing environment 103 of FIG. 2 provides a component view of the trace processing system 127 that is in communication with multiple user services 130, which may be operated by multiple customers of the hosting provider. As a user service 130 reports portions of code traces, those portions are first received by a load balancer 203 that distributes the code traces for processing approximately evenly across a plurality of trace processing entities 206*a*, 206*b* . . . 206N.

The trace processing entities 206 apply time-based compression to compress traces received within a particular time window. The compressed traces are then stored upon expiration of the particular time window by the storage service 118. In one embodiment, the compressed traces are stored in a key-value store, with the key being the unique identifier of the trace and the data being the binary compressed data of the trace.

The trace processing system 127 may also include a trace indexing service 207, a trace analysis service 209, a control entity 212, among other components. The trace indexing service 207 is executed periodically to retrieve recently stored traces from the storage service 118 and to perform indexing functionality. This indexing functionality may be performed asynchronously with respect to the storage of the traces by the trace processing entities 206. The trace analysis service 209 may be executed to generate metrics and/or relationships gleaned through an analysis of the stored and indexed traces. The control entity 212 may be executed to generate dashboard and/or control user interfaces 142 as well as perform automatic scaling and/or other management functions for the trace processing system 127.

Figure 3:
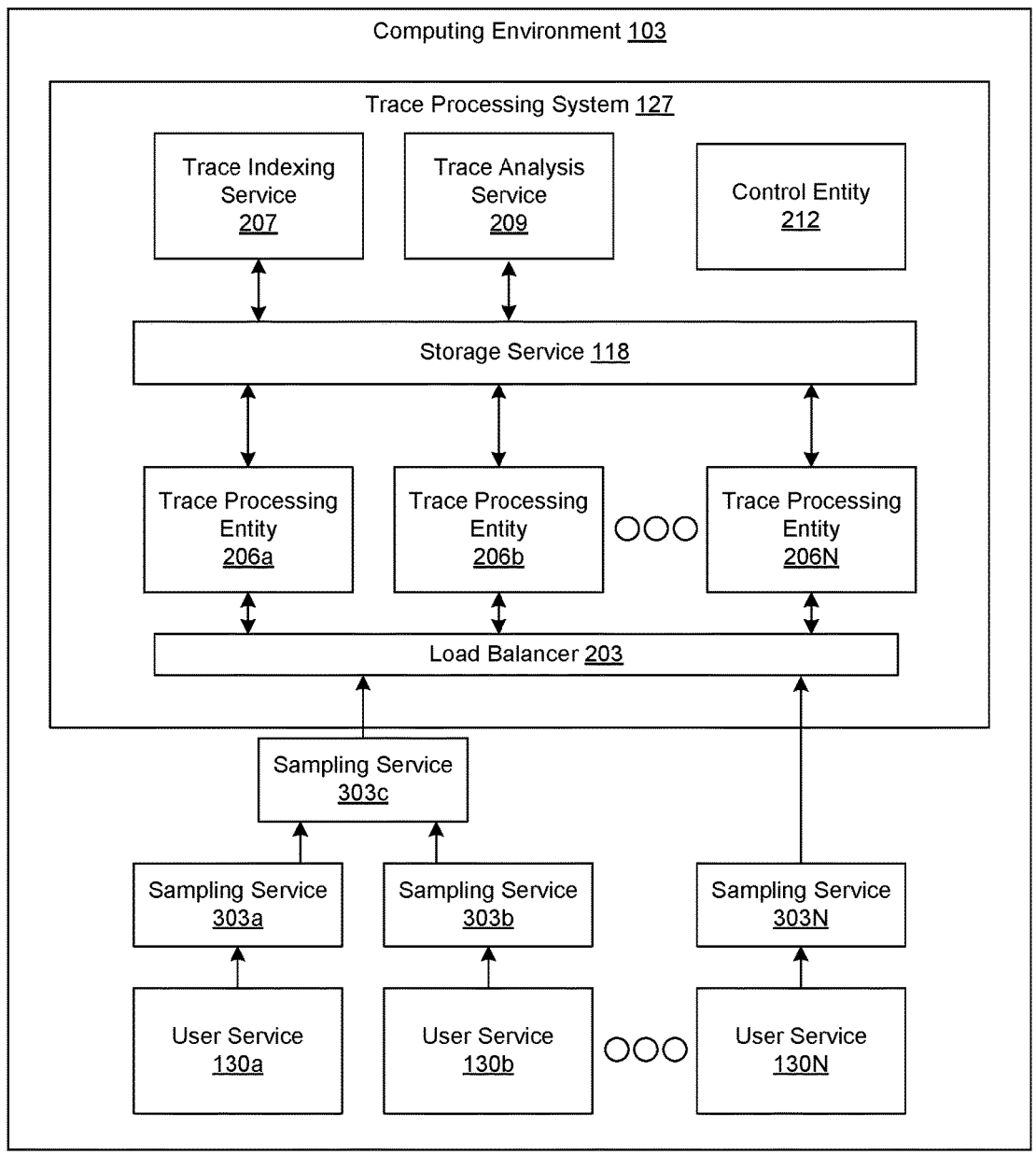

Moving on to FIG. 3, shown is an alternative view of the computing environment 103 (FIG. 2) according to embodiments that support trace sampling. Rather than forwarding trace segments directly to the load balancer 203 as in FIG. 2, in the embodiments of FIG. 3, the user services 130 forward traces to sampling services 303*a*, 303*b* . . . 303N. The sampling services 303 apply sampling parameters to forward a configurable fraction of the code traces to the trace processing system 127 for further processing. The result can be characterized as a blend of reservoir sampling, where up to a fixed target of traces are collected, with Bernoulli sampling, where a percentage of additional traces are sampled. The sampling services 303 can be deployed in the computing environment 103 to be relatively "close" to the user services 130. For example, a sampling service 303 may be executed on the same machine instance as the user service 130 in order to reduce network traffic.

The sampling services 303 regularly report sampling metrics to the control entity 212 of the trace processing system 127. In turn, the control entity 212 may send directives to the sampling services 303 to adjust sampling parameters to increase or decrease sampling of traces. The sampling parameters may be dynamically adjusted in order to contain costs within a specified budget, to take advantage of lower costs, to respond to changes in request traffic, and/or for other reasons.

In some cases, a hierarchy or tier of sampling services 303 may be employed. As shown in FIG. 3, sampling services 303*a* and 303*b* forward traces to a sampling service 303*c*, which can perform further sampling as needed. Also, sampling rates may be adjusted on a per-service basis and/or on a per-request type basis. For example, different actions or request types may have different sampling parameters. In one embodiment, a first tier of sampling services 303 (e.g., sampling services 303*a* and 303*b*) may perform a coarse-grained, imprecise sampling, while a second tier of sampling services (e.g. the sampling service 303*c*) may perform a fine-grained, more precise sampling.

Figure 4:
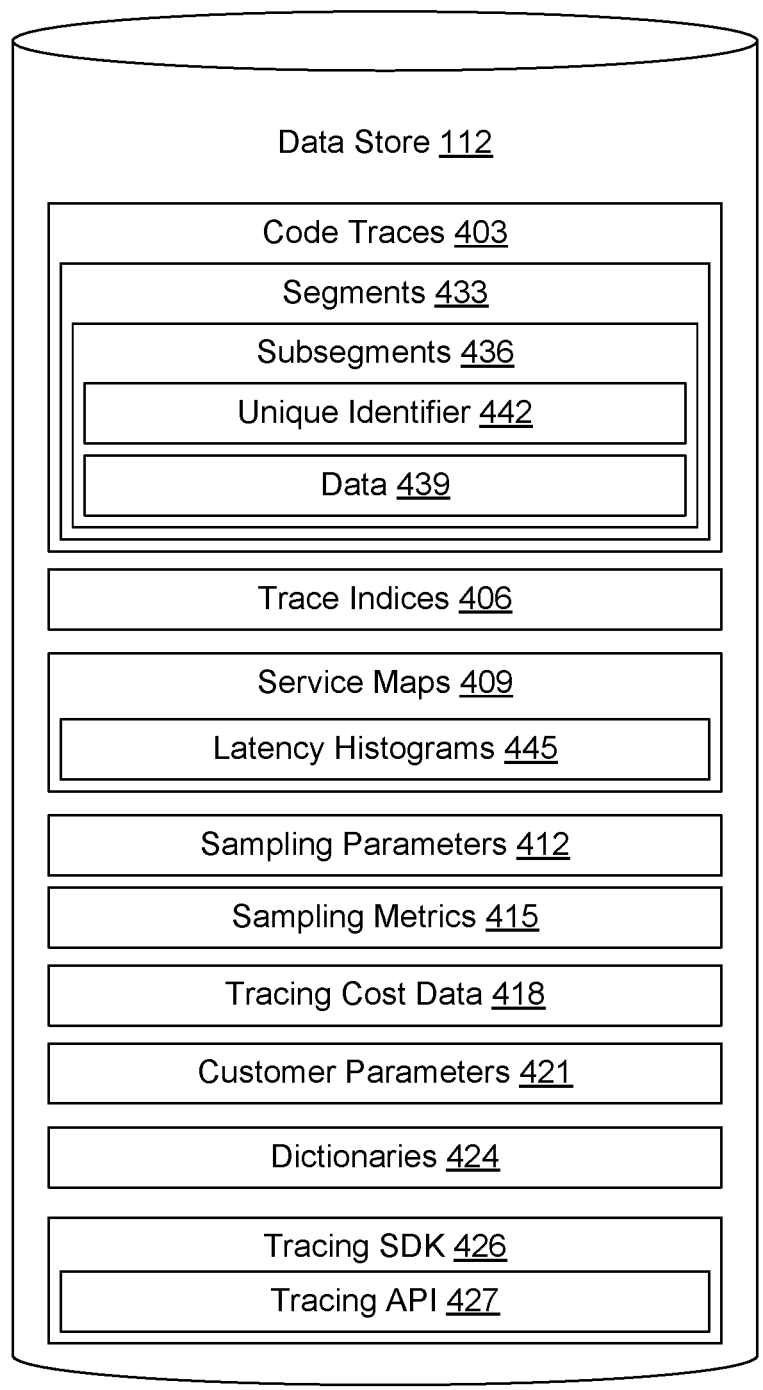
FIG. 4 is a schematic block diagram of a data store used in the networked environment of FIG. 1 according to various embodiments of the present disclosure.

Continuing to FIG. 4, shown is one example of a data store 112 (FIG. 1) according to various embodiments. Among the various data stored in the data store 112 are code traces 403, trace indices 406, service maps 409, sampling parameters 412, sampling metrics 415, tracing cost data 418, customer parameters 421, dictionaries 424, a tracing software development kit (SDK) 426 providing a tracing API 427, and/or other data.

The code traces 403 correspond to traces of calls between various component services of an application 115 (FIG. 1) in response to a particular request 133 (FIG. 1). That is to say, a single request 133 that may originate from a client device 106 (FIG. 1) can cause a sequence of service calls to be invoked to the user services 130 (FIG. 1). The user services 130 can then call other user services 130, other services within the computing environment 103, and external services. Information about these various calls are stored as a code trace 403 in segments 433 and subsegments 436. A segment 433 may be a portion of a code trace 403 associated with a specific time period and may be composed of one or more subsegments 436.

A subsegment 436 can describe a particular call and contains corresponding data 439. All subsegments 436 in a code trace 403 are associated with a single unique identifier 442, which uniquely identifies the particular request 133 corresponding to the code trace subsegment 436. The data 439 can include, for example, a resource URL, error indicators, response times, identification of a calling service, identification of a called service, an HTTP user agent, a client network address, results returned, and/or other data.

The code traces 403 may be stored in a compressed format, such that a dictionary 424 is necessary to decode them. It is noted that a code trace 403 may be updated over a relatively long time frame, e.g., up to a week. In such cases, a code trace 403 may be updated to incorporate additional segments 433 and subsegments 436. This may involve deleting the previously stored code traces 403 and/or recompressing the previously stored code traces 403 with the additional segments 433 and subsegments 436 being incorporated.

Also, the code traces 403 may include local execution information about a user service 130 for debugging purposes. For example, a code trace 403 may report time to parse a file, time to perform a computation, and/or other local runtime information.

The trace indices 406 provide searchable indices for the code traces 403 based on various attributes, such as a domain name of a called service, a request type, a client network address, and/or other attributes. The trace indices 406 may be generated periodically and asynchronously with respect to the storage of the code traces 403.

The service maps 409 correspond to data for user interfaces 142 (FIG. 1) that are generated by the trace analysis service 209 (FIG. 2). For example, a service map 409 may include a visual representation of the plurality of calls to the plurality of component services of the particular application 115 across a plurality of requests 133 received by the particular application 115. Another example type of user interface 142 may include latency histograms 445 that indicate response time or latency for different user services 130 and/or different request types as analyzed by the trace analysis service 209 across multiple code traces 403.

The sampling parameters 412 correspond to parameters that control sampling of code traces 403 by the sampling services 303. The sampling parameters 412 may specify a fixed number and/or a proportion or percentage of code traces 403 (or segments 433 or subsegments 436 thereof) to be forwarded or dropped during a specified time period. For example, the sampling parameters 412 may specify that twenty percent of all code trace segments 433 received in a five-second period should be forwarded. Different sampling parameters 412 may be applied for different request types and/or user services 130, and the sampling parameters 412 may be dynamically updated under control of the control entity 212 (FIG. 2).

The sampling metrics 415 report metrics regarding which and/or how many code trace segments 433 were forwarded and/or discarded during a sample time period. For example, the sampling metrics 415 may indicate that no code trace segments 433 were received, and therefore none were forwarded or dropped. The volume of requests and how they are handled are reported as these sampling metrics 415 to the control entity 212, which may choose to adjust the sampling parameters 412 in view of the sampling metrics 415.

The tracing cost data 418 may indicate a current cost associated with processing code traces 403 by the tracing processing system 127. Different costs may be associated with storing code traces 403 or accessing code traces 403 (e.g., as part of a search query or for analysis performed by the trace analysis service 209). These costs may change over time. The fluctuations may depend on prices of underlying computer resources in the computing environment 103, which may fluctuate based upon demand and availability.

The customer parameters 421 control the operation of the tracing processing system 127 for a given customer. For example, a customer may elect to turn tracing collection on or off, or to adjust sampling rates for particular services or request types. A customer may also specify a target cost for tracing, with maximum and/or minimum thresholds for the target.

The dictionaries 424 are used to perform time-based compression of code traces 403. For a given code trace 403, there may be a great deal of repetition of text, such as domain names, URLs, network addresses, and so forth. A dictionary 424 is generated so that repetitious text can be replaced with a binary symbol, thereby effecting data compression. The dictionary 424 may be regenerated over a time window. The time window for regenerating a dictionary 424 may be greater than a time window for which segments 433 of a code trace 403 are aggregated for storage.

The tracing SDK 426 comprises code that when included in the application 115 or user services 130 of the customer, enables tracing of calls using the tracing API 427. Although use of the tracing API 427 may be a prerequisite for tracing, it is noted that tracing collection and processing may be turned on or off or sampled dynamically even if the tracing API 427 is used by code of a customer.

Figure 5:
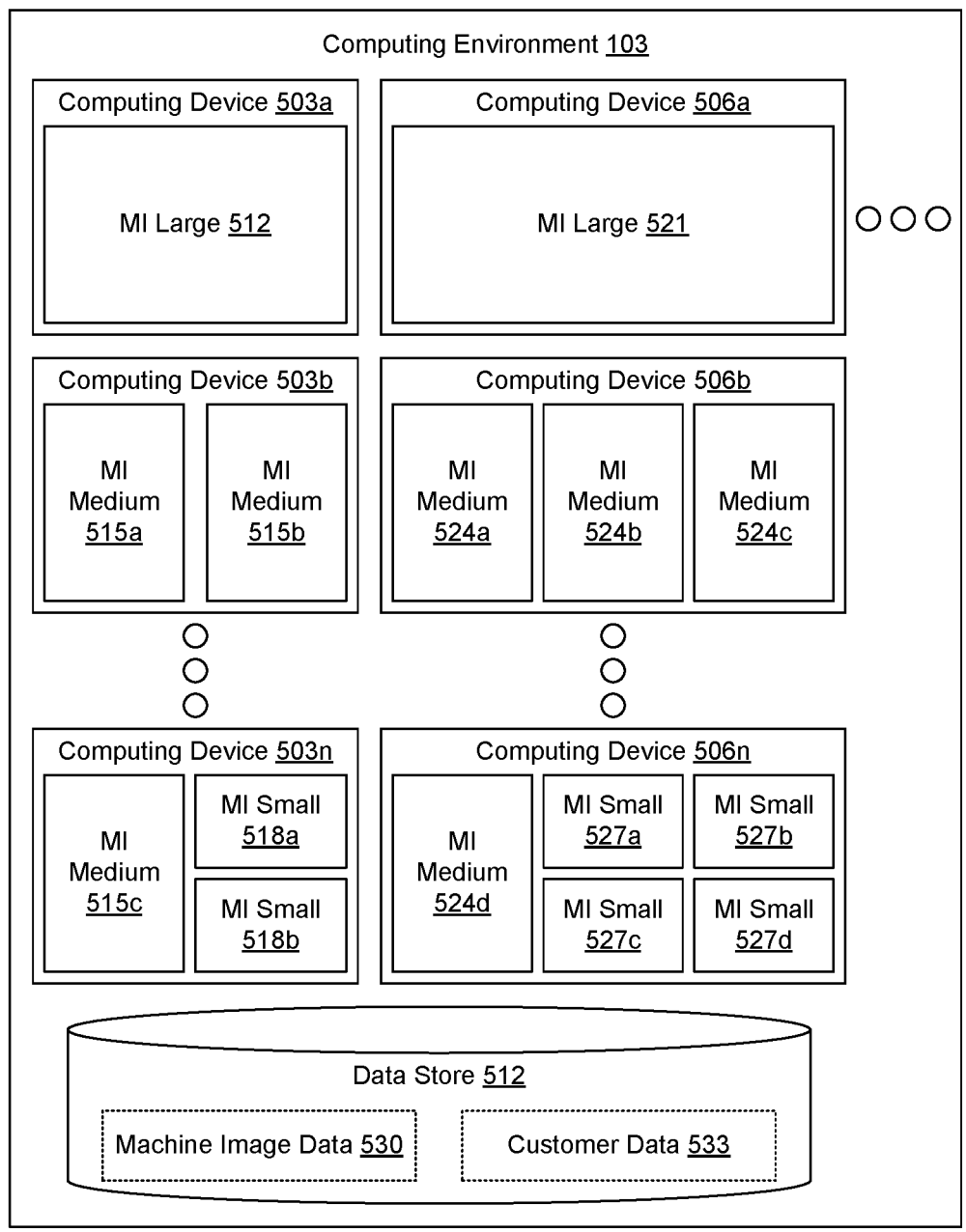
FIG. 5 is a schematic block diagram of a computing environment used in the networked environment of FIG. 1 according to various embodiments of the present disclosure.

Referring next to FIG. 5, shown is one example of a computing environment 103 according to various embodiments. The computing environment 103 includes a plurality of computing devices 503*a*, 503*b* . . . 503*n*, a plurality of computing devices 506*a*, 506*b* . . . 506*n*, and a data store 509. Such components of the computing environment 103 may be in data communication with each other and/or external computing devices by way of a network. Such computing devices 503 and 506 may be located in a single installation or may be dispersed among many different geographical locations.

Computing devices 503 and 506 may correspond to differing hardware platforms in various embodiments. Accordingly, computing devices 503 and 506 may have differing hardware configurations, for example, of central processing units (CPUs), system memory, data storage, network bandwidth, and/or other hardware characteristics. In one embodiment, all computing devices 503*a*, 503*b* . . . 503*n* may have a first hardware configuration, while all computing devices 506*a*, 506*b* . . . 506*n* may have a second hardware configuration. Although only two sets of computing devices 503 and 506 are shown, it is understood that there may be any number of sets of computing devices 503 and 506 having different hardware configurations.

Each computing device 503, 506 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 5, computing devices 503 may support three types of machine instances: MI large 512, MI medium 515, and MI small 518, each of which may be associated with differing resource configurations. As a non-limiting example, each MI large 512 instance may have four CPU-equivalent units, 15 GB of system memory, and 1,000 GB of data storage. Each MI medium 515 instance may have two CPU-equivalent units, 10 GB of system memory, and 500 GB of data storage. Also, each MI small 518 instance may have one CPU-equivalent unit, 5 GB of system memory, and 550 GB of data storage. In the example of FIG. 5, computing devices 506 may also support three types of machine instances, namely, MI large 521, MI medium 524, and MI small 527. MI large 521, MI medium 524, and MI small 527 may have the same respective configurations as MI large 512, MI medium 515, and MI small 518 or may have different configurations as desired. As a non-limiting example, a MI large 521 instance may have four CPU-equivalent units, 50 GB of system memory, and 1,000 GB of data storage.

The example of three types of machine instances for each type of computing device 503, 506 is not intended to be limiting. In various embodiments, there may be more or fewer types of machine instances for each type of computing device 503, 506. In one embodiment, a machine instance may comprise an allocation of an entire computing device 503, 506 with no virtualization.

In the example of FIG. 5, one MI large 512 instance is executing on computing device 503a, two MI medium 515a, 515b instances are executing on computing device 503b, one MI medium 515c instance and two MI small 518a, 518b instances are executing on computing device 503n, one MI large 521 instance is executing on computing device 506a, three MI medium 524a, 524b, 524c instances are executing on computing device 506b, and one MI medium 524d instance and four MI small 527a, 527b, 527c, 527d instances are executing on computing device 506n. Each machine instance may be associated with a customer, though any customer may be associated with any number of machine instances.

In various embodiments, a customer may be capable of launching new machine instances and/or terminating machine instances dynamically. Thus, the computing environment 103 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance.

Various applications and/or other functionality may be executed in the machine instances and in the computing devices 503, 506 according to various embodiments. Also, various data is stored in a data store 509 that is accessible to the computing devices 503, 506. The data store 509 may be representative of a plurality of data stores 509 as can be appreciated. The data stored in the data store 509 includes, for example, machine image data 530, customer data 533, and potentially other data.

Machine image data 530 may include data used to launch a machine instance. Machine image data 530 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 533 may include customer-specific data. In one embodiment, all customer configuration data for a machine instance is stored in customer data 533. In this way, such data may be easily shared among many machine instances. As a non-limiting example, the customer data 533 may include network pages to be served up by one or more network page servers executing on machine instances associated with a customer. However, it is understood that in some embodiments customer-specific data may be stored within local data storage associated with a machine instance.

Figure 6:
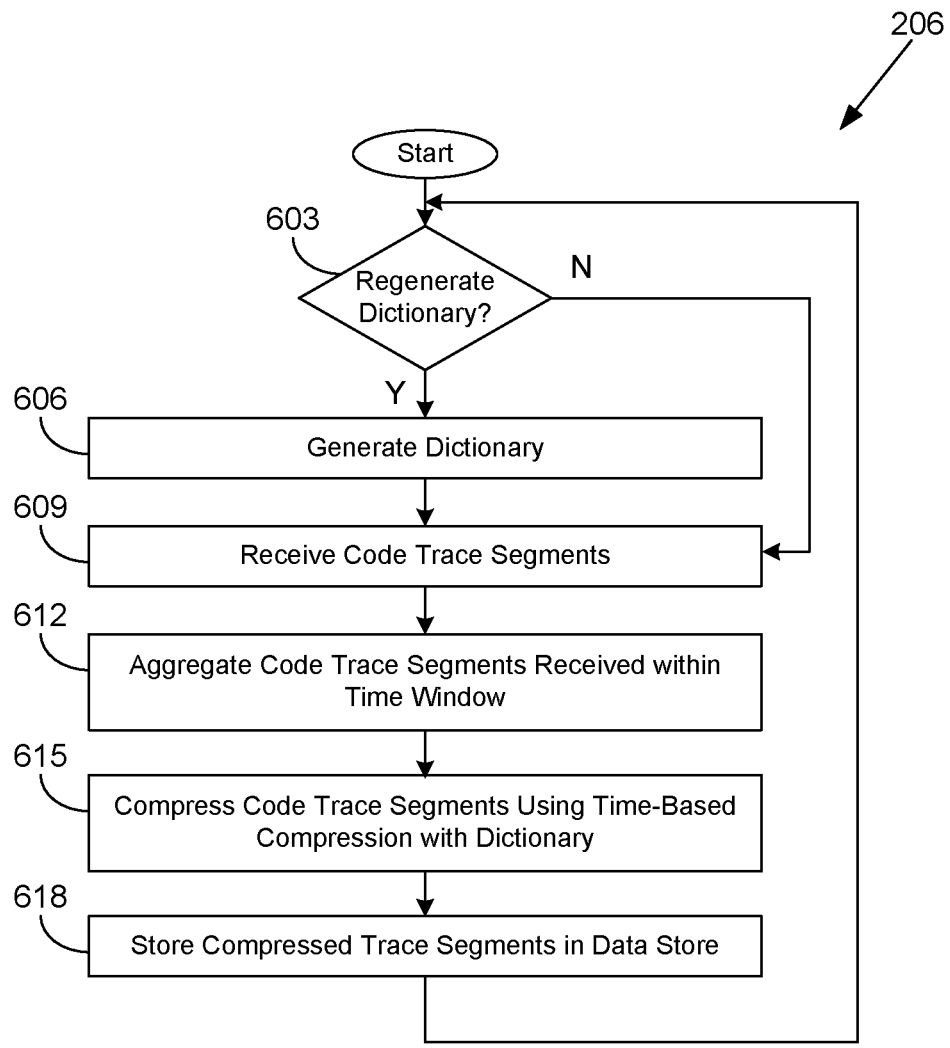
FIG. 6 is a flowchart illustrating one example of functionality implemented as portions of a trace processing entity executed in a computing environment in the networked environment of FIG. 1 according to various embodiments of the present disclosure.

Referring next to FIG. 6, shown is a flowchart that provides one example of the operation of a portion of the trace processing entity 206 (FIG. 2) according to various embodiments. It is understood that the flowchart of FIG. 6 provides merely an example of the many different types of functional arrangements that may be employed to implement the operation of the portion of the trace processing entity 206 as described herein. As an alternative, the flowchart of FIG. 6 may be viewed as depicting an example of elements of a method implemented in the computing environment 103 (FIG. 1) according to one or more embodiments.

Beginning with box 603, the trace processing entity 206 determines whether to regenerate a dictionary 424 (FIG. 4) based at least in part on an expiration of a time window. The trace processing entity 206 may periodically regenerate the dictionary 424 in order to effectively compress code traces 403 (FIG. 2), which are more likely to resemble each other within a given period of time.

If the dictionary 424 is to be regenerated, the trace processing entity 206 moves to box 606 and generates an updated dictionary 424. In doing so, the trace processing entity 206 may examine code traces 403 received within a time window and determine frequently occurring strings or substrings. These frequently occurring strings or substrings can be assigned relatively short binary symbols, thereby compressing the length of the code trace 403. The trace processing entity 206 continues to box 609. If the dictionary 424 is not to be regenerated, the trace processing entity 206 continues to box 609.

In box 609, the trace processing entity 206 receives segments 433 (FIG. 4) of code traces 403. The trace processing entity 206 then aggregates the code trace segments 433 received within a time window in box 612. The segments 433 are stored temporarily in a volatile memory rather than a persistent memory for speed. It is noted that the time window for regenerating the dictionary 424 may be longer than the time window for aggregating code trace segments 433. In box 615, the trace processing entity 206 compresses the aggregated code trace segments 433 using time-based compression with the dictionary 424.

In box 618, the trace processing entity 206 stores the compressed code trace segments 433 in the data store 112 (FIG. 4) via the storage service 118 (FIG. 2). For example, the code trace segments 433 may be stored using a key of the unique identifier 442 (FIG. 2) with the value being the compressed binary data. Thereafter, the operation of the trace processing entity 206 may return to box 603 and again determine whether to regenerate the dictionary 424.

Figure 7:
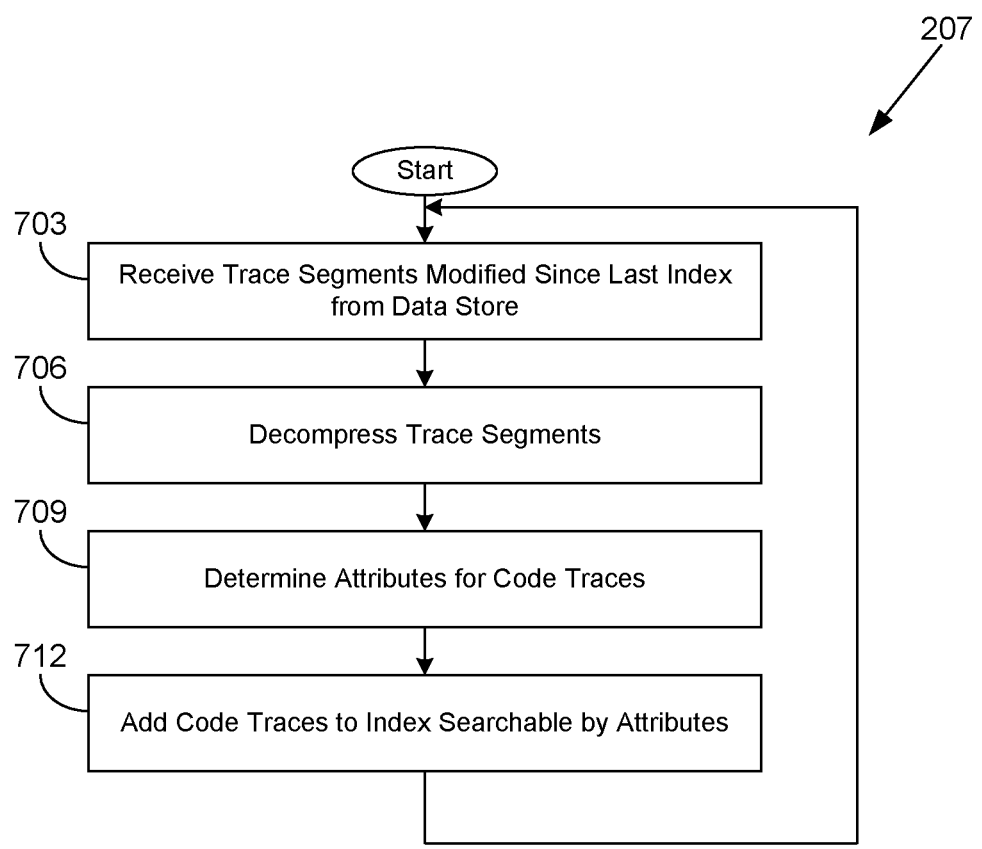
FIG. 7 is a flowchart illustrating one example of functionality implemented as portions of a trace indexing service executed in a computing environment in the networked environment of FIG. 1 according to various embodiments of the present disclosure.

Turning now to FIG. 7, shown is a flowchart that provides one example of the operation of a portion of the trace indexing service 207 according to various embodiments. It is understood that the flowchart of FIG. 7 provides merely an example of the many different types of functional arrangements that may be employed to implement the operation of the portion of the trace indexing service 207 as described herein. As an alternative, the flowchart of FIG. 7 may be viewed as depicting an example of elements of a method implemented in the computing environment 103 (FIG. 2) according to one or more embodiments.

Beginning with box 703, the trace indexing service 207 receives trace segments 433 (FIG. 4) from the data store 112 (FIG. 4) that have been modified since the last indexing operation was performed. For example, the storage service 118 (FIG. 2) may support a "diff" operation that provides all of the data added since a previous point in time. In box 706, the trace indexing service 207 decompresses the segments 433 using corresponding dictionaries 424 (FIG. 4).

In box 709, the trace indexing service 207 determines a plurality of attributes for the code traces 403 (FIG. 4) from the data 439 (FIG. 4). In box 712, the trace indexing service 207 adds the code traces 403 to one or more of the trace indices 406 (FIG. 4) that are searchable by the attributes.

Thereafter, the operation of the trace indexing service 207 returns to box 703. It is noted that the indexing process performed by the trace indexing service 207 is performed asynchronously with respect to the storage of the code traces 403 by the trace processing entities 206 (FIG. 2). The indexing may be performed periodically at a longer time window than for aggregating and storing the code traces 403.

Figure 8:
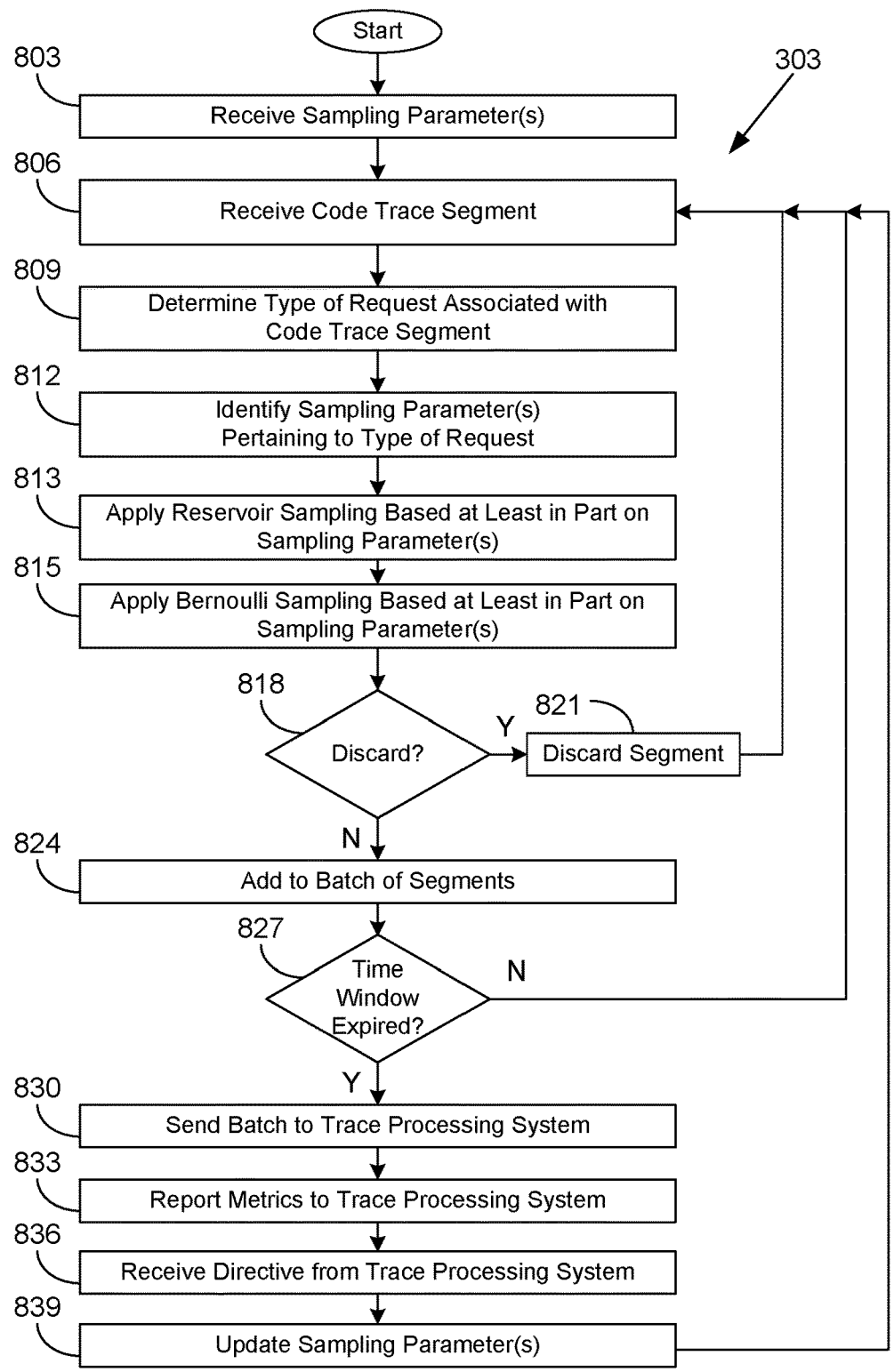
FIG. 8 is a flowchart illustrating one example of functionality implemented as portions of a sampling service executed in a computing environment in the networked environment of FIG. 1 according to various embodiments of the present disclosure.

Continuing to FIG. 8, shown is a flowchart that provides one example of the operation of a portion of the sampling service 303 according to various embodiments. It is understood that the flowchart of FIG. 8 provides merely an example of the many different types of functional arrangements that may be employed to implement the operation of the portion of the sampling service 303 as described herein. As an alternative, the flowchart of FIG. 8 may be viewed as depicting an example of elements of a method implemented in the computing environment 103 (FIG. 3) according to one or more embodiments.

Beginning with box 803, the sampling service 303 receives one or more sampling parameters 412 (FIG. 4) that control the sampling of code traces 403 (FIG. 4) processed by the sampling service 303. In box 806, the sampling service 303 receives a segment 433 (FIG. 4) of a code trace 403. In box 809, the sampling service 303 determines a type of request 133 (FIG. 1) associated with the segment 433. For instance, the type may be determined based upon a URL, a domain name, a path, an action, or other parameter indicating the type of request 133. In box 812, the sampling service 303 identifies one or more of the sampling parameters 412 that pertain to the type of request 133. In box 813, the sampling service 303 applies reservoir sampling based at least in part on the sampling parameter(s) 412 to collect a fixed number of code traces 403 for a time period. For instance, if a sampling parameter 412 specifies that fifty traces should be collected per second and then one hundred traces are received in a second, the first fifty traces will be collected. In box 815, the sampling service 303 applies Bernoulli sampling based at least in part on the sampling parameter(s) 412 to sample a percentage of the additional code trace segments 433 received during a time window. For instance, if a sampling parameter 412 specifies a ten percent sampling rate, five additional traces beyond the fifty traces collected via reservoir sampling will be collected via Bernoulli sampling out of the one hundred traces in a second.

In box 818, the sampling service 303 determines whether to discard the segment 433 or to forward the segment 433 for further processing. If the sampling service 303 determines to discard the segment 433, the sampling service 303 discards the segment 433 in box 821 and then returns to box 806 where an additional code trace segment 433 is received. If instead, the sampling service 303 determines to forward the segment 433, the sampling service 303 continues to box 824.

In box 824, the sampling service 303 adds the segment 433 to a batch of segments 433. In box 827, the sampling service 303 determines whether a time window has expired. If a time window has not expired, the sampling service 303 returns to box 806 and receives another code trace segment 433. Otherwise, the sampling service 303 continues to box 830.

In box 830, the sampling service 303 sends the batch of segments 433 to the trace processing system 127 (FIG. 3). In box 833, the sampling service 303 reports one or more sampling metrics 415 (FIG. 4) to the trace processing system 127. These sampling metrics 415 may include information about the number of code traces 403 or segments 433 processed, forwarded, discarded, and so forth. In box 836, the sampling service 303 receives a directive from the trace processing system 127 to dynamically adjust the sampling for one or more request types.

In box 839, the sampling service 303 dynamically adjusts one or more sampling parameters 412 to modify the sampling in response to the directive. In one use case, the sampling service 303 may dynamically increase traces forwarded (as a proportion) when fewer traces are received, or may dynamically decrease traces forwarded (as a proportion) when more traces are received. Thereafter, the sampling service 303 may return to box 806 and receive an additional code trace segment 433.

Figure 9:
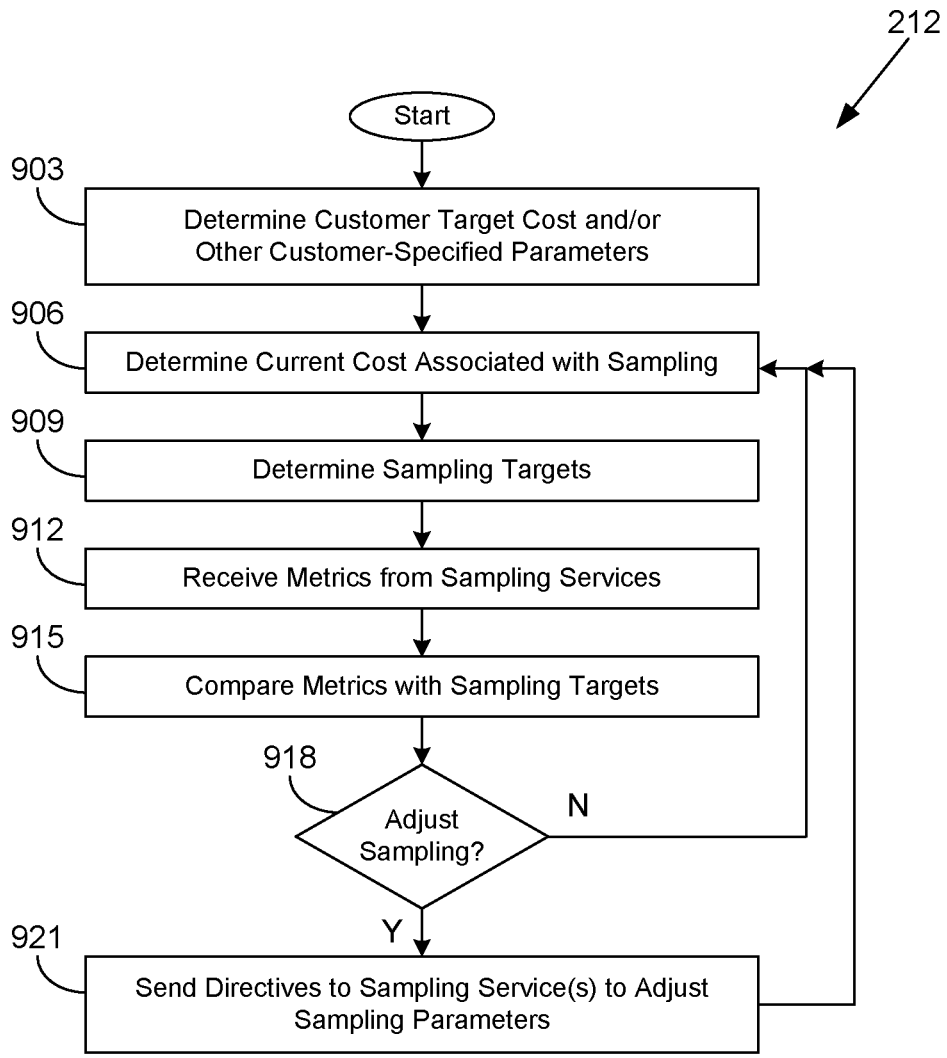
FIG. 9 is a flowchart illustrating one example of functionality implemented as portions of a control entity of a trace processing system executed in a computing environment in the networked environment of FIG. 1 according to various embodiments of the present disclosure.

Referring next to FIG. 9, shown is a flowchart that provides one example of the operation of a portion of the control entity 212 (FIG. 3) according to various embodiments. It is understood that the flowchart of FIG. 9 provides merely an example of the many different types of functional arrangements that may be employed to implement the operation of the portion of the control entity 212 as described herein. As an alternative, the flowchart of FIG. 9 may be viewed as depicting an example of elements of a method implemented in the computing environment 103 (FIG. 1) according to one or more embodiments.

Beginning with box 903, the control entity 212 determines a customer target cost and/or other customer specified parameters. For example, a customer may specify whether sampling is enabled or disabled, or specific sampling percentages for various services and/or request types. In box 906, the control entity 212 determines a current cost associated with sampling (e.g., collecting code traces) from the tracing cost data 418 (FIG. 4). In box 909, the control entity 212 determines sampling targets (e.g., a target number of traces to collect for a given time period) for individual ones of the sampling services 303 (FIG. 3). For example, the control entity 212 may be configured to limit sampling to a target cost based on a current cost and a number of sampled code traces 403 (FIG. 4).

In box 912, the control entity 212 receives sampling metrics 415 (FIG. 4) from individual ones of the sampling services 303. For example, the control entity 212 may receive information indicating a number of code traces 403 or segments 433 received in a time period. In box 915, the control entity 212 compares the sampling metrics 415 with the sampling targets (e.g., a target number of traces to collect).

In box 918, the control entity 212 determines whether to adjust the sampling. If sampling is not to be adjusted, the control entity 212 returns to box 906 and reassesses the current cost. Otherwise, the control entity 212 moves to box 921 and sends directives to one or more sampling services 303 to dynamically adjust one or more of the sampling parameters 412 (FIG. 4). Thereafter, the control entity 212 returns to box 906 and reassesses the current cost.

Figure 10:
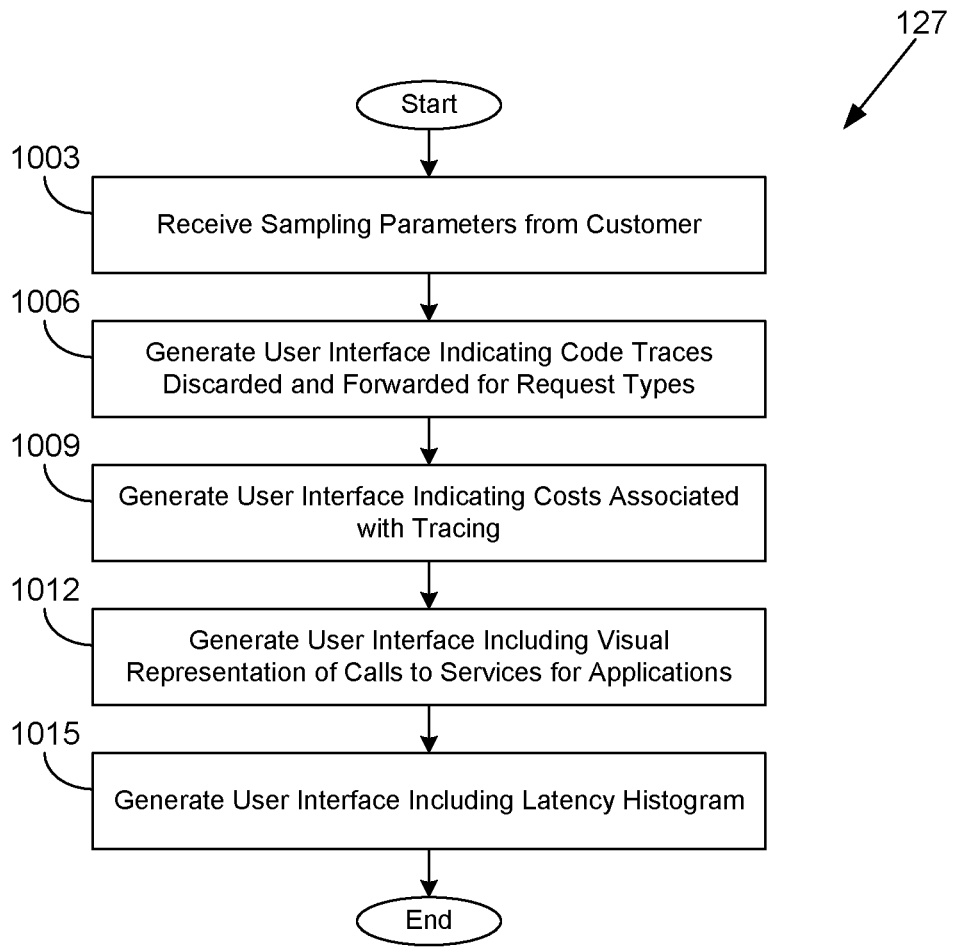
FIG. 10 is a flowchart illustrating one example of functionality implemented as portions of a trace processing system executed in a computing environment in the networked environment of FIG. 1 according to various embodiments of the present disclosure.

Moving now to FIG. 10, shown is a flowchart that provides one example of the operation of a portion of the trace processing system 127 according to various embodiments. It is understood that the flowchart of FIG. 10 provides merely an example of the many different types of functional arrangements that may be employed to implement the operation of the portion of the trace processing system 127 as described herein. As an alternative, the flowchart of FIG. 10 may be viewed as depicting an example of elements of a method implemented in the computing environment 103 (FIG. 1) according to one or more embodiments.

Beginning with box 1003, the trace processing system 127 receives sampling parameters 412 (FIG. 4) from a customer, which can enable or disable trace collection. In box 1006, the trace processing system 127 generates a user interface 142 (FIG. 1) that indicates sampling metrics 415 (FIG. 4) such as code traces 403 that are discarded and code traces 403 that are forwarded for collection for various request types.

In box 1009, the trace processing system 127 generates a user interface 142 indicating costs with tracing, including collection of traces and/or analysis of traces. These costs may be broken down by user service 130 (FIG. 1), application 115 (FIG. 1), request type, time period, or other factors.

In box 1012, the trace processing system 127 generates a user interface 142 including a visual representation of calls to component services of applications 115, or a service map 409 (FIG. 4). In box 1015, the trace processing system 127 generates a user interface 142 that includes a latency histogram 445 (FIG. 4) indicating respective latencies associated with request types, services, or applications. Data for the user interfaces 142 may be generated via the trace analysis service 209 (FIG. 2) to access trace data and perform analyses. Thereafter, the operation of the portion of the trace processing system 127 ends.

Figure 11:
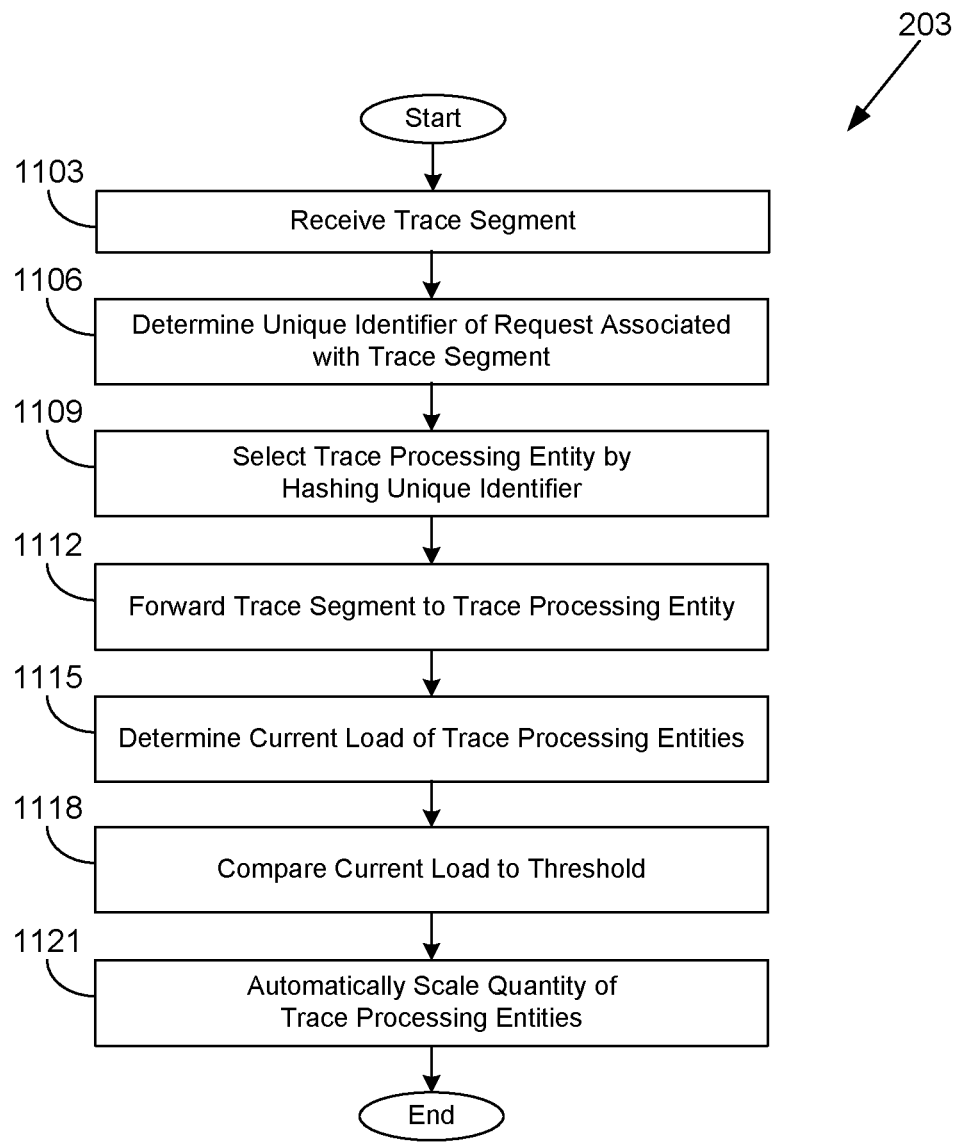
FIG. 11 is a flowchart illustrating one example of functionality implemented as portions of a load balancer executed in a computing environment in the networked environment of FIG. 1 according to various embodiments of the present disclosure.

Referring next to FIG. 11, shown is a flowchart that provides one example of the operation of a portion of the load balancer 203 (FIG. 2) according to various embodiments. It is understood that the flowchart of FIG. 11 provides merely an example of the many different types of functional arrangements that may be employed to implement the operation of the portion of the load balancer 203 as described herein. As an alternative, the flowchart of FIG. 11 may be viewed as depicting an example of elements of a method implemented in the computing environment 103 (FIG. 2) according to one or more embodiments.

Beginning with box 1103, the load balancer 203 receives a trace segment 433 (FIG. 4) from a sampling service 303 (FIG. 3) or a daemon executing on the same machine instance as the user service 130 (FIG. 2). In box 1106, the load balancer 203 determines a unique identifier 442 (FIG. 4) of a request 133 (FIG. 1) associated with the trace segment 433.

In box 1109, the load balancer 203 selects a trace processing entity 206 (FIG. 2) out of a plurality of trace processing entities 206 based at least in part on applying a hashing function to the unique identifier 442. The hashing function should evenly distribute the unique identifiers 442 among the trace processing entities 206 to balance the load. In box 1112, the load balancer 203 forwards the trace segment 433 to the trace processing entity 206.

In box 1115, the load balancer 203 determines a current resource load of the trace processing entities 206 (e.g., processor usage, memory usage, numbers of traces processed, etc.). In box 1118, the load balancer 203 compares the current load to a threshold, which could be a minimum threshold or a maximum threshold. In box 1121, the load balancer 203 causes the quantity of trace processing entities 206 to be automatically scaled up or down depending on whether the load is too low or too high. Thus, if the load exceeds a maximum threshold, the number of trace processing entities 206 will be increased, while if a load is beneath a minimum threshold, the number of trace processing entities 206 will be decreased. Hysteresis over a time frame can be used to limit unnecessary scaling up or down with short term load changes. The hashing function can be adjusted to evenly distribute the trace segments 433 to the new quantity of trace processing entities 206. Thereafter, the operation of the portion of the load balancer 203 ends.

Figure 12:
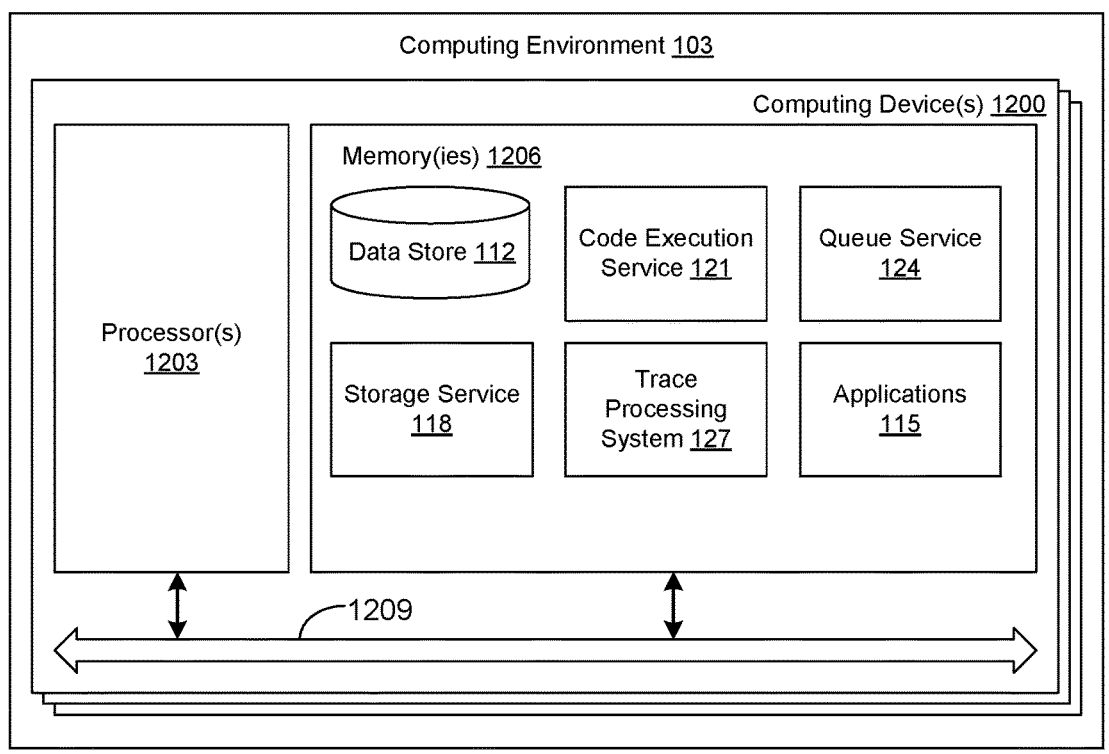
FIG. 12 is a schematic block diagram that provides one example illustration of a computing environment employed in the networked environment of FIG. 1 according to various embodiments of the present disclosure.

With reference to FIG. 12, shown is a schematic block diagram of the computing environment 103 according to an embodiment of the present disclosure. The computing environment 103 includes one or more computing devices 1200. Each computing device 1200 includes at least one processor circuit, for example, having a processor 1203 and a memory 1206, both of which are coupled to a local interface 1209. To this end, each computing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are a storage service 118, a code execution service 121, a queue service 124, a trace processing system 127, applications 115, and potentially other applications. Also stored in the memory 1206 may be a data store 112 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and/or multiple processor cores and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the storage service 118, the code execution service 121, the queue service 124, the trace processing system 127, the applications 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6-11 show the functionality and operation of an implementation of portions of the trace processing system 127 and the sampling service 303. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 6-11 show a specific order of execution, it is understood that the order of execution may differ from that which is depicted. For example, the order of execution of two or more blocks may be scrambled relative to the order shown. Also, two or more blocks shown in succession in FIGS. 6-11 may be executed concurrently or with partial concurrence. Further, in some embodiments, one or more of the blocks shown in FIGS. 6-11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the storage service 118, the code execution service 121, the queue service 124, the trace processing system 127, and the applications 115, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the storage service 118, the code execution service 121, the queue service 124, the trace processing system 127, and the applications 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices 1200 in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
one or more processors; and
memory to store computer-executable instructions that, if executed, cause the one or more processors to at least:
receive a segment of a code trace corresponding to a request submitted to a particular application of a plurality of applications hosted in a computing environment, wherein the code trace documents at least one call to at least one component service of the particular application to respond to the request;
determine whether to discard the segment based at least in part on at least one sampling parameter;
discard the segment; and
aggregate another segment in a batch before forwarding the other segment to a trace processing system as part of the batch.

2. The system of claim 1, wherein the at least one sampling parameter specifies a percentage of code trace segments to retain over a time period.

3. The system of claim 1, wherein the at least one sampling parameter is based at least in part on a target cost and a current cost associated with sampling.

4. A system, comprising:
one or more processors; and
memory to store computer-executable instructions that, if executed, cause the one or more processors to at least:
receive a segment of a code trace corresponding to a request submitted to a particular application of a plurality of applications hosted in a computing environment, wherein the code trace documents at least one call to at least one component service of the particular application to respond to the request;
determine whether to discard the segment based at least in part on at least one sampling parameter;
discard the segment;
maintain information indicating code traces received, forwarded, or discarded within a time window; and
send the information to a trace processing system.

5. The system of claim 4, wherein, if executed, the computer-executable instructions further cause the one or more processors to at least adjust the at least one sampling parameter based at least in part on a directive received from the trace processing system.

6. A system, comprising
one or more processors; and
memory to store computer-executable instructions that, if executed, cause the one or more processors to at least:
receive a segment of a code trace corresponding to a request submitted to a particular application of a plurality of applications hosted in a computing environment, wherein the code trace documents at least one call to at least one component service of the particular application to respond to the request;
determine whether to discard the segment based at least in part on at least one sampling parameter;
discard the segment; and
apply reservoir sampling to collect a fixed number of code traces followed by Bernoulli sampling to collect a percentage of additional code traces based at least in part on the at least one sampling parameter.

7. A system, comprising:
one or more processors; and
memory to store computer-executable instructions that, if executed cause the one or more processors to at least:
receive a segment of a code trace corresponding to a request submitted to a particular application of a plurality of applications hosted in a computing environment, wherein the code trace documents at least one call to at least one component service of the particular application to respond to the request;
determine whether to discard the segment based at least in part on at least one sampling parameter;
discard the segment; and
wherein the at least one sampling parameter comprises a first sampling parameter that pertains to a first type of request, and a second sampling parameter that pertains to a second type of request, wherein a type of the request is identified by at least a portion of a uniform resource locator (URL).

8. A system, comprising:
one or more processors; and
memory to store computer-executable instructions that, if executed, cause the one or more processors to at least:
receive a segment of a code trace corresponding to a request submitted to a particular application of a plurality of applications hosted in a computing environment, wherein the code trace documents at least one call to at least one component service of the particular application to respond to the request;
determine whether to discard the segment based at least in part on at least one sampling parameter;
discard the segment;
receive another segment of another code trace corresponding to another request submitted to a particular application of a plurality of applications hosted in a computing environment, wherein the other code trace documents at least one call to at least one component service of the particular application to respond to the other request;
determine whether to forward the other segment to a trace processing system based at least in part on at least one sampling parameter; and
forward the other segment to the trace processing system.

9. The system of claim 8, wherein, if executed, the computer-executable instructions further cause the one or more processors to at least adjust the at least one sampling parameter based at least in part on a directive received from the trace processing system.

10. The system of claim 8, wherein the at least one sampling parameter is based at least in part on a target cost and a current cost associated with sampling.

11. A method, comprising:
receiving, by one or more processors, information indicating a number of code traces processed by a sampling service within a time window, wherein the sampling service is to forward or discard individual code traces according to at least one sampling parameter;
causing, by the one or more processors, the sampling service to dynamically adjust the at least one sampling parameter based at least in part on a difference between the number of code traces and a target number of code traces; and
generating a user interface indicating code traces discarded and code traces forwarded for individual ones of a plurality of request types for a particular application based at least in part on the number of code traces.

12. The method of claim 11, wherein the sampling service is to forward the code traces that have been sampled to another sampling service that also performs sampling.

13. The method of claim 12, wherein the sampling service and the other sampling service are executed by respective ones of a plurality of machine instances in a computing environment.

14. The method of claim 11, wherein the at least one sampling parameter includes a plurality of sampling percentages associated with respective ones of the plurality of request types for a particular application.

15. A method, comprising:
receiving, by one or more processors, information indicating a number of code traces processed by a sampling service within a time window, wherein the sampling service is to forward or discard individual code traces according to at least one sampling parameter;
causing, by the one or more processors, the sampling service to dynamically adjust the at least one sampling parameter based at least in part on a difference between the number of code traces and a target number of code traces; and
determining the target number of code traces based at least in part on a current transaction volume of a plurality of applications associated with a customer of a hosting provider.

16. The method of claim 15, wherein the sampling service is executed by a same machine instance as an application whose code traces are being sampled by the sampling service.

17. The method of claim 15, further comprising:
determining a current cost associated with computing resources in a computing environment in which the sampling service is executed; and
determining the target number of code traces further based at least in part on the current cost and a target cost.

18. The method of claim 15, wherein the at least one sampling parameter includes a plurality of sampling percentages associated with respective ones of a plurality of request types for a particular application.

19. A method, comprising:
receiving, by one or more processors, information indicating a number of code traces processed by a sampling service within a time window, wherein the sampling service is to forward or discard individual code traces according to at least one sampling parameter;
causing, by the one or more processors, the sampling service to dynamically adjust the at feast one sampling parameter based at least in part on a difference between the number of code traces and a target number of code traces; and
wherein the sampling service employs a combination of reservoir sampling and Bernoulli sampling based at least in part on the at least one sampling parameter.

20. The method of claim 19, further comprising:
determining a current cost associated with computing resources in a computing environment in which the sampling service is executed; and
determining the target number of code traces based at least in part on the current cost and a target cost.

* * * * *